US012700222B2

(12) United States Patent　　　　(10) Patent No.:　US 12,700,222 B2
Chen et al.　　　　　　　　　　　　　(45) Date of Patent:　Aug. 4, 2026

(54) METHODS USING SELECTIVE QUERY RECOLLECTION FOR ENHANCED TRAINING OF QUERY-BASED OBJECT DETECTORS

(71) Applicant: CARNEGIE MELLON UNIVERSITY, Pittsburgh, PA (US)

(72) Inventors: Fangyi Chen, Pittsburgh, PA (US); Marios Savvides, Pittsburgh, PA (US); Han Zhang, Pittsburgh, PA (US); Kai Hu, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 200 days.

(21) Appl. No.: 18/508,328

(22) Filed: Nov. 14, 2023

(65) Prior Publication Data

US 2024/0161469 A1　　May 16, 2024

Related U.S. Application Data

(60) Provisional application No. 63/425,211, filed on Nov. 14, 2022.

(51) Int. Cl.
G06V 10/774　　　　(2022.01)

(52) U.S. Cl.
CPC ................................. *G06V 10/774* (2022.01)

(58) Field of Classification Search
None
See application file for complete search history.

(56) References Cited

U.S. PATENT DOCUMENTS

2023/0262259 A1 *　8/2023　Liang ..................... H04N 19/31
　　　　　　　　　　　　　　　　　　　　375/240.12

* cited by examiner

*Primary Examiner* — Leon Flores
(74) *Attorney, Agent, or Firm* — KDW FIRM PLLC

(57) ABSTRACT

Disclosed herein are training strategies for query-based object detectors, referred to herein as Query Recollection (QR). In one variation or QR, dense query recollection, every intermediate query is collected and independently forwarded to every downstream stage. In a second variation or QR, selective query recollection, intermediate queries are collected from the two nearest previous stages and forwarded to the next downstream stage. This eliminates the phenomena wherein intermediate stages of the decoder produce more accurate results than later stages of the decoder.

10 Claims, 3 Drawing Sheets

*(a) Basic*   *(b) Dense QR*   *(c) Selective QR*

Collection C        $q^{0\text{-}1\text{-}2}$ Query, from initial to stage 1 then to 2

Output of stage/QR      $\hat{q}$      Query with supervision applied

METHODS USING SELECTIVE QUERY RECOLLECTION FOR ENHANCED TRAINING OF QUERY-BASED OBJECT DETECTORS

RELATED APPLICATIONS

This application claims the benefit of U.S. Provisional Patent Applications No. 63/425,211, filed Nov. 14, 2022, the contents of which are incorporated herein in its entirety.

BACKGROUND OF THE INVENTION

Object detection is a long-established topic in computer vision aiming to localize and categorize objects of interest. Prior art methods rely on dense priors tiled at feature grids so as to detect in a sliding-window paradigm and have dominated object detection for the last few years, but these methods fail to overcome many hand-crafted processing steps such as anchor generation or non-maximum suppression, which block end-to-end optimization.

Recent research attention has been geared towards query-based object detection. By viewing detection as a direct set prediction problem, the new archetype represents the set of objects using a set of learn-able embeddings, termed as queries, which are fed to a decoder consisting of a stack (typically six) of decoding stages. Each stage performs similar operations: (1) interacting queries with image features via an attention-like mechanism, so the queries are aggregated with valuable information that represents objects; (2) reasoning the relation among all queries so that global dependency on objects cooccurrence and duplicates could be captured; and (3) interpreting bounding box and category from each query by a feed forward network. Queries are sequentially processed stage-by-stage, and each stage is formulated to learn a residual function with reference to the former stage's output, aiming to refine queries in a cascaded style.

As such, the decoding procedure implies that detection should be stage-by-stage enhanced in terms of intersection over union (IoU) and confidence score. Indeed, monotonically improved average precision (AP) is empirically achieved by this procedure. However, when visualizing the stage-wise predictions, it is surprising to note that the decoder makes mistakes in a significant proportion of cases where the later stages degrade true-positives and upgrade false-positives from the former stages. As shown in FIG. 1, the traffic light at stage 1 gets categorical confidence of 0.41, while from stage 2 to 5 the confidence gradually decreases to 0.21; the remote at stage 3 was wrongly classified as a cell phone, while from stage 3 to 6 the error was exacerbated from 0.26 to 0.42.

This phenomenon may be explained as such. First, the responsibility that each stage takes is unbalanced, while supervision applied to them is analogous. An early stage could make mistakes without causing too much impact because it gets chances to be corrected later, and the later stages are more responsible for the final prediction. But during training, all of these stages are supervised in an equivalent manner and there lacks such a mechanism that places particular training emphasis on later stages. Second, due to the sequential structure of the decoder, an intermediate query refined by a stage regardless of whether this refinement brings positive or negative effects, will be cascaded to the following stages, while the query prior to the refinement never gets an opportunity to be propagated forward even though it emerges unscathed and might be more representative than the refined one. The cascading errors increase the difficulty of convergence and the sequential structure impedes the later stages from seeing prior queries during training.

SUMMARY OF THE INVENTION

Disclosed herein is a training strategy for query-based object detectors, referred to herein as Query Recollection (QR). QR cumulatively collects intermediate queries as stages go deeper and feeds the collected queries to the downstream stages aside from the sequential structure. By each stage, the new add-ins alongside the original inputs are independently treated among each other, so the attentions and losses are calculated individually. In such a manner, QR enjoys two key features: (1) The number of supervision signals per stage grows in geometric progression, so that later stages get more supervision than the former ones. For example, the sixth stage gets 32 times more supervision than the first stage; (2) Later stages are able to view the outputs beyond its neighboring stage for training, which mitigates the potential impact due to cascading errors.

Further, selective forward queries to each stage, not with the entire query collection but only those from the prior two stages, raises the number of supervision in a Fibonacci sequence which halves the extra computing cost and brings even better results. This enhancement is referred to herein as Selective Query Recollection (SQR), which can be summarized as an effective training strategy that elegantly fits query-based object detectors.

DETAILED DESCRIPTION

Figure 1:
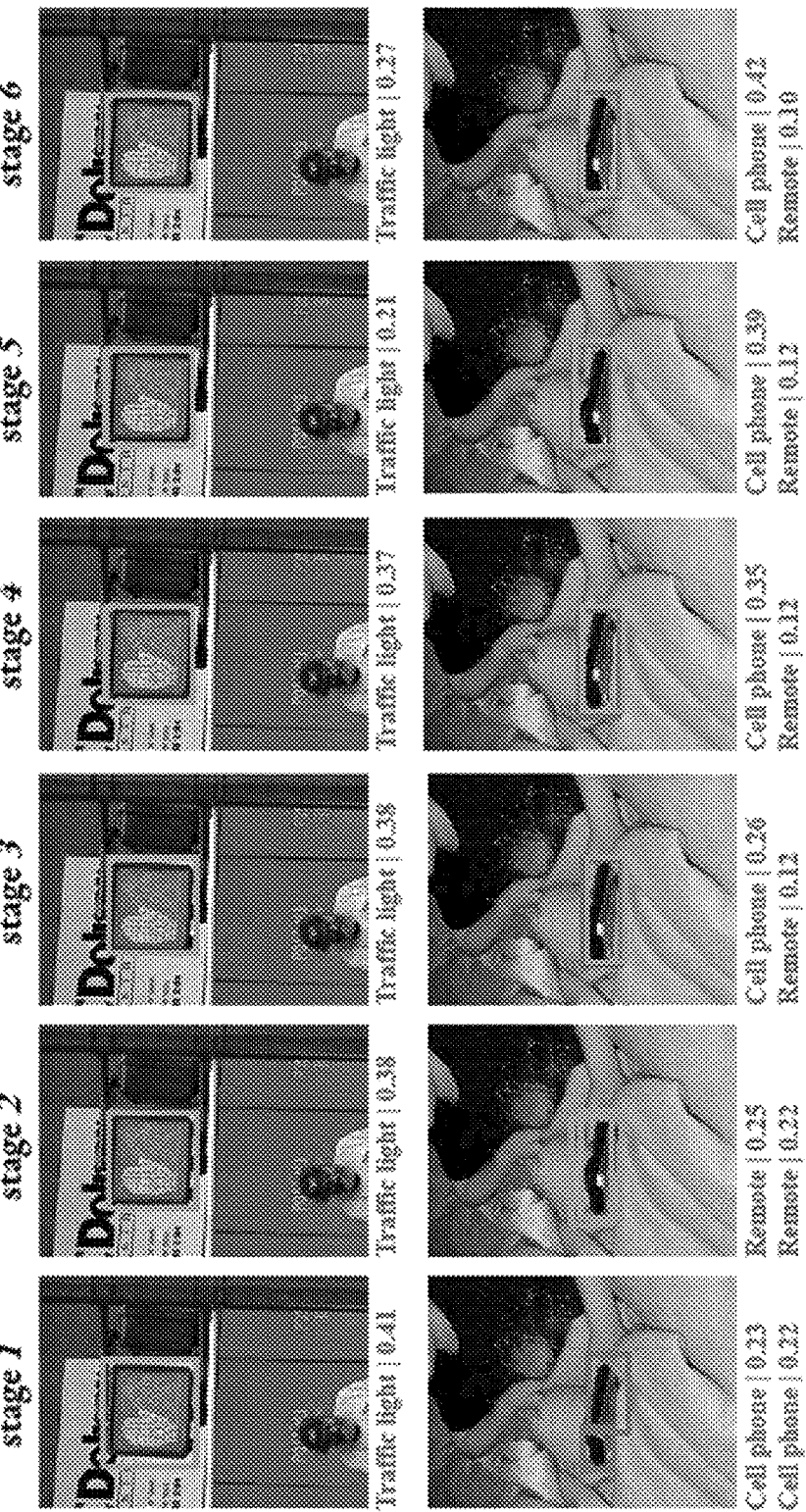
FIG. 1 shows examples of a query-based object detector performing stage-by-stage prediction enhancement.
Figure 2:
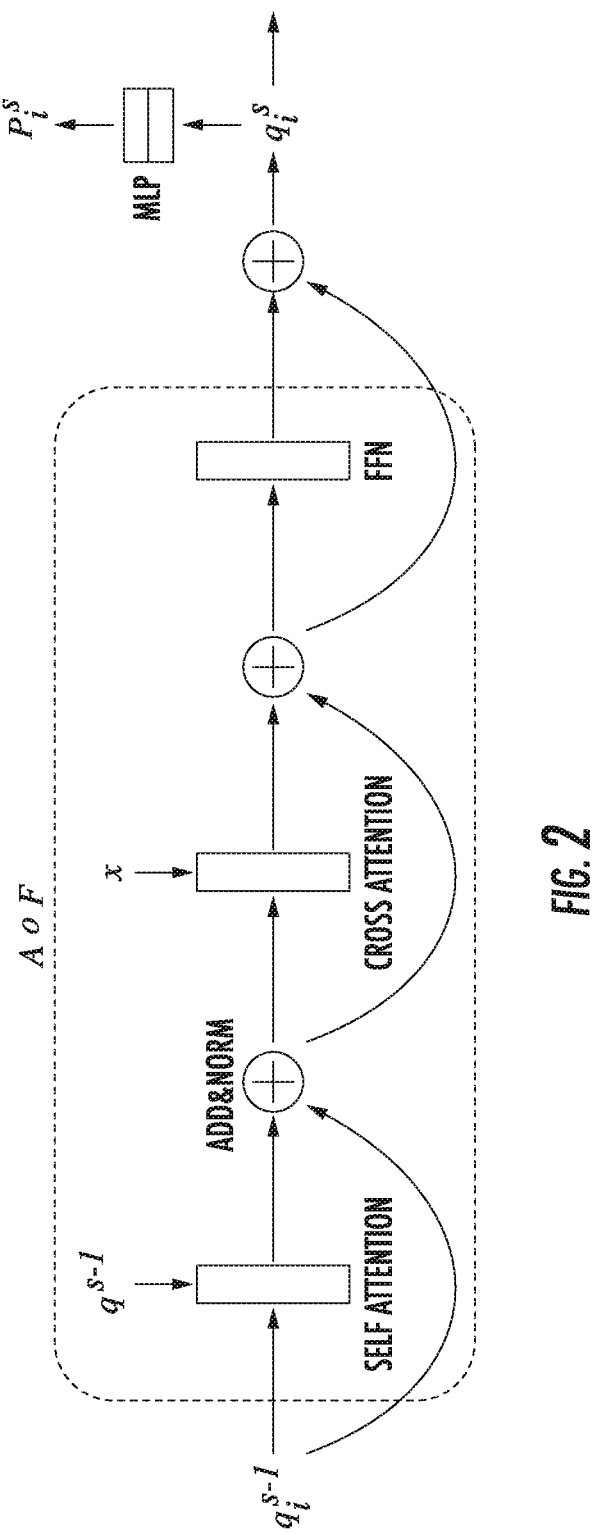
FIG. 2 is a block diagram of a single decoding stage of a query-based object detector.

In query-based object detection, queries are updated successively. A typical structure of a single decoding stage of a query-based object detector is illustrated in FIG. 2. An initial query $$q_i^0 (i \in N = \{1, 2, \dots, n\})$$

is an embedding trained through back-propagation, and n is the total number of initial queries. During inference, the first stage updates the initial query by adding a residual term to it, producing intermediate query $$q_i^1,$$

followed by later stages sequentially updating the intermediate query in the same way. The procedure can be formulated as:

$$q_i^s = D^s\left(q_i^{s-1}, q^{s-1}, x\right) = q_i^{s-1} + (\mathcal{A} \circ \mathcal{F})\left(q_i^{s-1}, q^{s-1}, x\right) \qquad (1)$$

where:

$D^s$ is a decoding stage;

s is a stage index;

$$q_i^s$$

is the $$i^{th}$$

query at stage s;

$q^s$ is a set of queries $$q^s = \{q_i^s, \mid i \in N\};$$

$(\mathcal{A} \circ \mathcal{F})$ stands for a bundle of modules including self and cross attention and feed forward network; and x means features.

A normalization function that applied on each module has been omitted for simplicity. Afterward, $$q_i^s$$

predicts an object $$P_i^s$$

via two multi-layer perceptrons for classification and regression:

$$P_i^s = (MLP_{cls}(q_i^s), MLP_{reg}(q_i^s)) \qquad (2)$$

$$P_i^{1\sim6}$$

are predicted by the $$q_i^{1\sim6}$$

rooted in $$q_i^0,$$

where $$P_i^6$$

is the expected outcome and $$P_i^{1\sim5}$$

are intermediate results.

$$P_i^s$$

is regarded as a true-positive towards a ground-truth G only if the IoU $$(P_i^s, G)$$

exceeds a threshold, its category matches with G, and the categorical score is ranked as the highest among all other counterparts.

Query-based models frequently predict the optimum at intermediate stages instead of the last one. Two obstacles impeding the occurrence of the most reliable predictions in the last stage, include the lack of training emphasis and the cascading errors from query sequence.

Disclosed herein is the Query Recollection (QR) training strategy that embraces uneven supervision applied to decoding stages that places emphasis on later ones, enhancing later stages for better final outcomes, and a variety of early-stage queries directly introduced to later stages, mitigating the impact of cascading errors.

Compared with prior art methods, QR collects intermediate queries at every stage and forwards them along the original pathway. Dense Query Recollection (DQR) is the fundamental form and Selective Query Recollection (SQR) is an advanced variant.

The process of single decoding stage (self-attention, cross-attention, FFN), the ground-truth assignment, and loss calculations are applied within a set of queries $\{q_i \mid i \in \{1, 2, \ldots, n\}\}$ where n is typically 100/300/500. The set of queries is regarded as a basic unit in the disclosed methods and is generally denoted as q.

Figure 3:
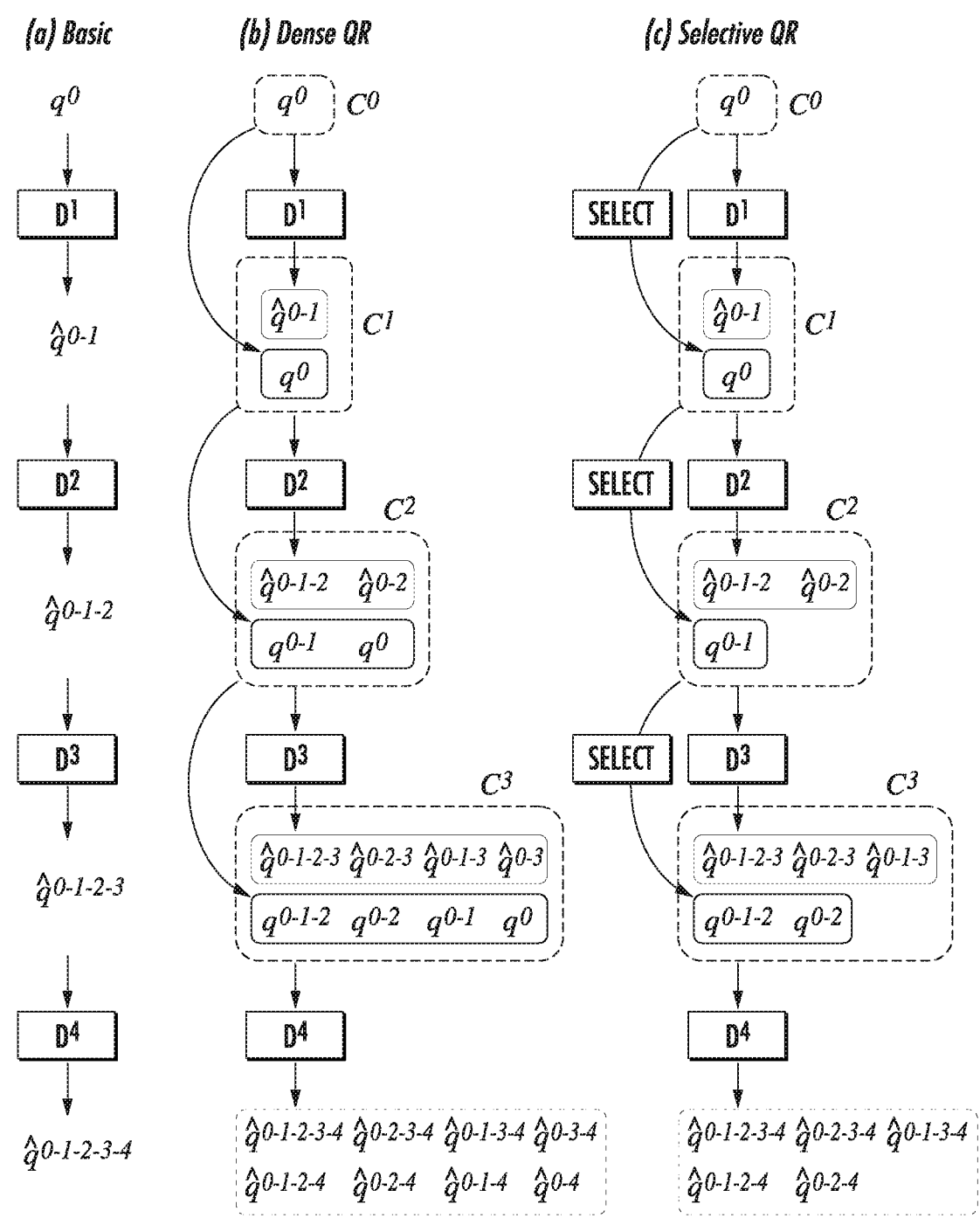
FIG. 3 is a block diagram showing a basic process for coding queries stage-by-stage (a); Dense Query Recollection (b); and Selective Query Recollection (c).

Basic Pathway—Query along the basic pathway is refined by all stages and is illustrated in FIG. 3($a$). Taking a 4-stages decoder as an example, we denote $q^{0\text{-}1\text{-}2\text{-}3\text{-}4}$ as the final query that is that is refined by all stages. The basic $\mathcal{PT}$ finally produces:

$$q^{0\text{-}1\text{-}2\text{-}3\text{-}4} = \mathcal{D}^4\big(\mathcal{D}^3\big(\mathcal{D}^2\big(\mathcal{D}^1(q_0)\big)\big)\big) \qquad (3)$$

$$= \mathcal{PT}^{1\text{-}2\text{-}3\text{-}4}(q^0) \qquad (4)$$

During training, the queries from each stage (i.e., ($q^{0\text{-}1}$, $Q^{0\text{-}1\text{-}2}$, $q^{0\text{-}1\text{-}2\text{-}3}$, $q^{0\text{-}1\text{-}2\text{-}3\text{-}4}$) are independently followed by Hungarian Assignment that matches ground-truth with q in a one-to-one manner, and then followed by loss calculation for supervision. In FIG. 3, those q that require supervision are marked as q̂. Along the basic pathway, the number of q̂ at each stage is 1.

Dense Query Recollection (DQR)—In this embodiment, every intermediate q is collected and independently forwarded to every downstream stage. This embodiment is illustrated in FIG. 3(*b*). After each stage, a collection C is formed where the number of q grows geometrically, namely $2^s$ at $s^{th}$ stage. Formally:

$$C^0 = \{q^0\} \tag{5}$$

$$C^s = \{D^s(q) \mid q \in C^{s-1}\} \cup C^{s-1} \tag{6}$$

In a collection C, half of the queries inside are newly generated by the current stage (i.e., from $\{D^s(q) \mid q \in C^{s-1}\}$) while the other half are from previous stages, $C^{s-1}$. Separately, for each q in the former half, Hungarian assignment and loss calculation are applied, so the number of supervision signals grows in geometric progression as well, namely $2^{s-1}$ at the $s^{th}$ stage.

As such, Dense Query Recollection satisfies the expectancy where the number of supervision signals for each stage grows as (1, 2, 4, 8, 16, 32), meanwhile, all prior queries would be visible in all later stages.

During inference, only the basic pathway is used, so the inference process is untouched. For a standard 6-stage decoder, the pathway is $\mathcal{PT}^{\,1\text{-}2\text{-}3\text{-}4\text{-}5\text{-}6}$.

DQR empirically enhances training, but the query collection process is indiscriminate, which brings two defects: First, the geometrical growth of the number of $\hat{q}$ and their attention/loss calculations are costly to compute. Second, if an early q is input that skips too many stages to a far-away late stage, the potential benefit could be overshadowed by the huge learning gap between the stages and query. For instance, if the initial $q^0$ is directly introduced to stage 6 and produces $\hat{q}^{0\text{-}6}$, this query would have the highest difficulty among all queries at stage 6 and the calculated loss would dominate the overall losses. This motivates the second embodiment in which intermediate q's are selectively collected rather than densely collecting all of them.

In a variation of DQR, termed DQRR (Dense Query Recollection+Recurrence), the model size may be reduced. Existing methods typically have more than 6 decoding stages in the decoder. The detector can be trained where all decoding stages share parameters, however, the model cannot converge. However, DQR has the capability to achieve this goal. A strong decoding stage at the end (i.e., the final stage), is obtained after training with DQR. This stage has seen every possibly intermediate query that ever existed along the decoding process. A natural attempt is to replace the parameters of all stages with the final stage's parameters during inference, forming a pathway as $\mathcal{PT}^{\,6\text{-}6\text{-}6\text{-}6\text{-}6\text{-}6}$. However, this results in a 0 AP result! The reason is that the output of stage 6 shifts from its input, so stage 6 cannot recognize its own output, thus, it applies random refinement (negative effect) on it.

To address the problem, during training, the output of stage 6 is recollected and fed back to itself as its input. As such, stage 6 gets chance to learn to refine its output. Stage 6 is then recurrently used only for inference.

Selective Query Recollection (SQR)—The queries from the adjacent stage and the stage prior to the adjacent stage are more likely to bring positive effects. Therefore, collection is selectively operated along the basic pathway: before starting stage $\mathcal{D}^{\,s}$, q is collected from the one or more nearest stages. For example, q can be collected from the 2 nearest stages, that is, the outputs of $\mathcal{D}^{\,s-1}$ and $D^{s-2}$ are selected as the input of $\mathcal{D}^{\,s}$.

Selective Query Recollection can be formulated as:

$$C^0 = \{q^0\} \quad C^1 = \{q^0, q^{0-1}\} \tag{7}$$

$$C^s = \{D^s(q) \mid q \in C^{s-1}\} \cup \text{select}\left(C^{s-1}\right) \tag{8}$$

$$= \{D^s(q) \mid q \in C^{s-1}\} \cup \{D^{s-1}(q) \mid q \in C^{s-2}\} \tag{9}$$

As such, Selective Query Recollection, illustrated in FIG. 3(*c*), satisfies the expectancy that the number of supervision signals grows in a Fibonacci sequence (1, 2, 3, 5, 8, 13) rather than exponentially. Compared to the DSR, to a great extent, SQR reduces the computing burden and outperforms the dense counterpart in terms of precision.

In variations of this embodiment, the starting stage for SQR may be varied. In the example described above and shown in FIG. 3(*c*), queries are collected starting from stage 1. Instead, the starting stage can be practically varied, which will further reduce the total queries in each collection and further reduce the computing burden. For example, if SQR is started from stage 2, the Fibonacci sequence will start from stage 2 and results in (1, 1, 2, 3, 5, 8); if SQR starts from stage 3, the resulting sequence is (1, 1, 1, 2, 3, 5). The starting stage is regarded as a hyper-parameter for SQR.

The methods disclosed here in address the phenomenon wherein the optimal detections of query-based object detectors are not always from the last decoding stage but can sometimes come from an intermediate decoding stage. Two limitations or prior art methods cause the issue (i.e., lack of training emphasis and cascading errors from query sequence). The SQR training strategy provides the advantage of being able to overcome these limitations and addresses the limitations of the prior art methods.

As would be realized by those of skill in the art, the training techniques disclosed herein may be used in any combination on any dataset. Specific examples used herein are not meant to limit the invention in any way. The scope of the claimed invention is given by the following claims:

The invention claimed is:

1. A method of training a query-based object detector having a plurality of decoding stages, comprising: receiving an input query at a first stage; inputting an input query collection to each subsequent stage, the input query collection comprising an output query collection from an immediately preceding stage and a query collection used as input for the immediately preceding stage; calculating, for each subsequent stage, a loss based on the output of that stage and the input query collection for that stage; and ack-propagating the calculated loss to that stage; thereby enhancing later stages to mitigate the impact of cascading errors.

2. The method of claim 1 further comprising: calculating, for a last stage a loss for all intermediate queries in the output collection of the last stage of the decoder.

3. The method of claim 1 wherein, for each stage, half of the output query collection comprises intermediate queries generated by the current stage and half of the output query collection comprises intermediate queries generated by previous stages.

4. The method of claim 2 further comprising: collecting an output query collection for the last stage of the decoder; using the output query collection of the last stage of the decoder as an input query collection to the last stage; and calculating a loss for the last stage.

5. A method of training a query-based object detector having a plurality of decoding stages, comprising: receiving an input query at a first stage; inputting an input query collection to each subsequent stage, the input query collection for each subsequent stage comprising an output query collection from one or more preceding stages and an input query collection from the one or more preceding stages calculating, for each subsequent stage, a loss based on the output of that state and the input query collections for that stage; and back-propagating the calculated loss to that stage; thereby enhancing later stages to mitigate the impact of cascading errors.

6. The method of claim 5 wherein the one or more previous stages comprises an immediately preceding stage.

7. The method of claim 5 wherein the one or more previous stages comprises two immediately preceding stages.

8. The method of claim 5 wherein the output query collection for all stages includes outputs from one or more previous stages.

9. The method of claim 5 wherein a starting stage for including outputs from one or more previous stages in the output query collection for the current stage varies.

10. The method of claim 5 further comprising:

calculating, for a last stage a loss for all intermediate queries in the output query collection of the last stage.

\* \* \* \* \*